US012411777B2

United States Patent
Sultan et al.

(10) Patent No.: US 12,411,777 B2
(45) Date of Patent: Sep. 9, 2025

(54) SYSTEMS AND METHODS TO GENERATE A CACHE MISS RATIO CURVE WHERE CACHE DATA HAS A TIME-TO-LIVE

(71) Applicants: HUAWEI TECHNOLOGIES CANADA CO., LTD., Kanata (CA); The Governing Council of the University of Toronto, Toronto (CA)

(72) Inventors: Sari Sultan, Toronto (CA); Kia Shakiba, Toronto (CA); Albert Lee, Toronto (CA); Michael Stumm, Toronto (CA); Ming Chen, Kanata (CA); Chung-Man Abelard Chow, Kanata (CA)

(73) Assignees: HUAWEI TECHNOLOGIES CANADA CO., LTD., Kanata (CA); The Governing Council of the University of Toronto, Toronto (CA)

( * ) Notice: Subject to any disclaimer, the term of this patent is extended or adjusted under 35 U.S.C. 154(b) by 144 days.

(21) Appl. No.: 17/982,136

(22) Filed: Nov. 7, 2022

(65) Prior Publication Data

US 2024/0152467 A1 May 9, 2024

(51) Int. Cl.
*G06F 12/128* (2016.01)
*G06F 12/0871* (2016.01)
*G06F 12/14* (2006.01)

(52) U.S. Cl.
CPC ........ *G06F 12/128* (2013.01); *G06F 12/0871* (2013.01); *G06F 12/1408* (2013.01)

(58) Field of Classification Search
None
See application file for complete search history.

(56) References Cited

U.S. PATENT DOCUMENTS

| | | | |
|---|---|---|---|
| 10,895,985 B1 | 1/2021 | Vasquez | |
| 2005/0188164 A1 | 8/2005 | Ballantyne | |
| 2015/0046653 A1* | 2/2015 | Soundararajan | G06F 12/0811 711/146 |
| 2017/0060769 A1* | 3/2017 | Wires | G06F 12/1018 |
| 2018/0046383 A1* | 2/2018 | Gates | G06F 3/0644 |
| 2018/0275909 A1* | 9/2018 | Agrawal | G06F 12/00 |
| 2021/0117322 A1* | 4/2021 | Baughman | H04L 67/61 |
| 2023/0244669 A1* | 8/2023 | Wu | G06F 16/185 707/769 |

OTHER PUBLICATIONS

R.L. Mattson et al., TraigerEvaluation techniques for storage hierarchies, IBM Syst J, 1970, p. 78 to 117.

(Continued)

*Primary Examiner* — Jared I Rutz
*Assistant Examiner* — Alexander J Yoon (57) ABSTRACT

For a given application, increasing the size of a cache is beneficial up to a certain point and the number of hits does not increase significantly with a greater cache size. This disclosure provides a method to determine a miss ratio curve, for a cache having data blocks with a time-to-live. A hashed value of a data block's key address can be used to generate a 2D HLL counter for storing expiry times of the data blocks. The 2D HLL counter can be converted to a 1D array, from which a stack distance can be calculated. A frequency distribution of stack distances can then be converted into a miss ratio curve, from which an appropriate cache size can be selected.

12 Claims, 8 Drawing Sheets

(56) References Cited

OTHER PUBLICATIONS

Jake Wires et al., Characterizing Storage Workloads with Counter Stacks, Oct. 2014.
HyperLogLog: the analysis of a near-optimal cardinality estimation algorithm, Philippe Flajolet, Éric Fusy, Olivier Gandouet and Frederic Meunier, DMTCS proc. AH, 2007, 127-146, 2007 Conference on Analysis of Algorithms.

* cited by examiner

SYSTEMS AND METHODS TO GENERATE A CACHE MISS RATIO CURVE WHERE CACHE DATA HAS A TIME-TO-LIVE

CROSS-REFERENCE TO RELATED APPLICATIONS

This is the first application filed for the present invention.

TECHNICAL FIELD OF THE INVENTION

This invention pertains generally to cache management, and in particular, to methods and systems to obtain a cache miss ratio curve where data blocks have a time-to-live.

BACKGROUND

The miss ratio of a cache, also referred to as "miss rate", can be defined as the number of misses, when requests are made for memory blocks in a cache, divided by the total number of requests, over a given time interval:

$$\text{miss ratio} = \frac{[\text{number of cache misses}]}{[\text{number of cache requests}]}$$

Similarly, a miss ratio curve (MRC) for a cache presents a miss ratio as a function of a cache's size. In the prior art, one approach to generate a miss ratio curve is to first, calculate a stack distance for data blocks (sequences of bits or bytes) in the cache; second, present a frequency distribution of stack distances (i.e. a histogram); and third, plot the histogram results into a scatter plot, as presented in Mattson et al. (R. L. Mattson, J. Gecsei, D. R. Slutz and I. L. Traiger, "Evaluation techniques for storage hierarchies," *IBM Systems Journal*, vol. 9, no. 2, pp. 78-117, 1970). That particular method introduces the concept of a "stack distance" which refers to the position, in a stack of data blocks, of the most recently referenced data block. Although a basic stack distance computation method can be somewhat inefficient, other MRC methods based on stack distance can include further techniques to enhance its efficiency.

While MRC techniques were revolutionary when they first appeared over fifty years ago, the available computational power at the time was insufficient for them to be used productively for many applications. Recent technical advancements have brought attention back to MRC techniques; however, certain fundamental limitations have yet to be overcome.

One limitation of MRC techniques of the prior art is their inability to support cache data having a life span, also known as a time-to-live (TTL). The general interest of having data with a TTL is to prevent it from remaining in storage indefinitely in case it doesn't get accessed or becomes inaccessible. An MRC technique that takes into account memory blocks with TTL would reduce the occurrence of certain errors in MRC results.

Therefore, there is a need for MRC techniques having the ability to support cache data having a time-to-live, as well as systems to implement such methods, and such methods and systems would obviate or mitigate limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Miss Ratio Curves (MRC) allow a cache size to be selected efficiently, which is important for an auto scaling feature in a caching service. Existing MRC methods, however, do not support recent caching system features such as cache data with time-to-live.

Methods and systems disclosed herein introduce MRC calculation methods that cover cache data with time-to-live, reduced memory use and improved performance.

Technical benefits include a method to determine an MRC that is compatible with applications using data blocks having (or associated with) a time to live (TTL). Applications using data blocks with TTLs have become widespread, and the ability to obtain an MRC for them could allow a system on which they are executed to run more efficiently (e.g. faster), by allocating just enough cache, while preserving more cache space for other uses.

Embodiments include a method to allocate a cache size comprising receiving a plurality of requests, each request for accessing a data block of a cache, and having a TTL indicator; generating a stack of 2D hyperloglog (HLL) counters; determining a stack distance for each request with a 2D HLL counter, each position in the 2D HLL counter identifying an expiry time based on the TTL indicator; generating a miss ratio curve, using a frequency distribution of the stack distances; determining the cache size according to the miss ratio curve; and allocating a cache of the determined cache size to satisfy a given performance requirement.

An embodiment can further comprise converting the 2D HLL counter into a 1D array, based on the expiry times.

An embodiment can further comprise determining a number of rows and a number of columns for the 2D HLL counter using a precision parameter.

An embodiment can further comprise determining a stack distance for each request with a 2D HLL counter comprises: hashing a string of bits with a hashing method, the length of which string is determined by the hashing method; determining a number of leading bits in the string of bits according to the precision parameter, which leading bits when converted to a decimal number determine a row of the 2D HLL counter; and determining a number of leading zeroes (NLZ), after the leading bits, which NLZ determines a column of the 2D HLL counter.

In an embodiment, wherein converting the 2D HLL counter into a 1D array, based on expiry times, comprises: scanning each row of the 2D HLL counter from the lowest indexed column to the highest indexed column; selecting for each row the index of the lowest indexed column; storing an expiry time that is non-expired and greater than 0; and storing in a 1D array each index of a lowest indexed column.

An embodiment can further comprise determining a plurality of parameters for an approximation of cardinality calculation from the 1D HLL array.

In an embodiment, each 2D HLL counter is for counting unique accesses to data blocks between two time steps.

In an embodiment, each expiry time is a storage time of a data block plus the TTL indicator of a request for that data block.

Embodiments include a system for allocating a cache comprising: at least one processor, at least one cache, and machine readable memory storing machine readable instructions which when executed by the at least one processor, configures the at least one processor to: receive a plurality of requests, each request for accessing a data block of a cache, and having a TTL indicator; generate a stack of 2D hyperloglog (HLL) counters; determine a stack distance for each request with a 2D HLL counter, each position in the 2D HLL counter identifying an expiry time based on the TTL indicator; generate a miss ratio curve, using a frequency distribution of the stack distances; determine the cache size according to the miss ratio curve; and allocate a cache of the determined cache size to satisfy a given performance requirement.

In an embodiment, the machine readable memory storing machine readable instructions can further configure the at least one processor to convert the 2D HLL counter into a 1D array, based on the expiry times.

In an embodiment, the machine readable memory storing machine readable instructions further configures the at least one processor to determine a number of rows and a number of columns for the 2D HLL counter.

In an embodiment, the machine readable memory storing machine readable instructions further configures the at least one processor to hash a string of bits with a hashing method, the length of which string is determined by the hashing method; determine a number of leading bits in the string of bits according to the precision parameter, which leading bits when converted to a decimal number determine a row of the 2D HLL counter; and determine a number of leading zeroes (NLZ), after the leading bits, which NLZ determines a column of the 2D HLL counter.

In an embodiment, the machine readable memory storing machine readable instructions which when executed by the at least one processor further configures the at least one processor to convert the 2D HLL counter into a 1D array, based on expiry times, comprises: machine readable memory storing machine readable instructions which when executed by the at least one processor configures the at least one processor to scan each row of the 2D HLL counter from the lowest indexed column to the highest indexed column; select for each row the index of the lowest indexed column; store an expiry time that is non-expired and greater than 0; and store in a 1D array each index of a lowest indexed column.

In an embodiment, the machine readable memory storing machine readable instructions further configures the at least one processor to determine a plurality of parameters for an approximation of cardinality calculation from the 1D HLL array.

In an embodiment, each 2D HLL counter is for counting unique accesses to data blocks between two time steps.

In an embodiment, each expiry time is a storage time of a data block plus the TTL indicator of a request for that data block.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features are identified by like reference numerals.

DETAILED DESCRIPTION

Embodiments include methods to obtain a miss ratio curve (MRC), that support data blocks having a time-to-live (TTL). Methods according to embodiments can also require less memory, and have a better performance than those of the prior art.

To improve cache utilization, a method according to embodiments can be implemented by a caching system provided by a cloud-based platform, and the cache size of a workload can be adjusted based on MRC results obtained. A customer can then return unused cached resources and therefore pay less for a service, while the cloud-based platform can resell the unused resources for more revenue.

A method according to embodiments can be used for a cache storing data with a TTL, by using a data structure based on a stack of counters (i.e. "counter stacks" in general), in which the counters are HyperLogLog counters as described hereunder.

In embodiments, a stack of counters refers to a data structure for which a stack distance can be calculated. Each counter can be for counting how many different data blocks are accessed during a certain time interval.

A stack distance calculation based on stacks of counters is part of an efficient way to generate an MRC, and it can allow further performance improvement techniques such as "streaming traces", "pruning", "down sampling", and in particular, it can allow the use of a "HyperLogLog" (HLL) method, including the data structure of HLL counters, as described hereunder.

Figure 1A:
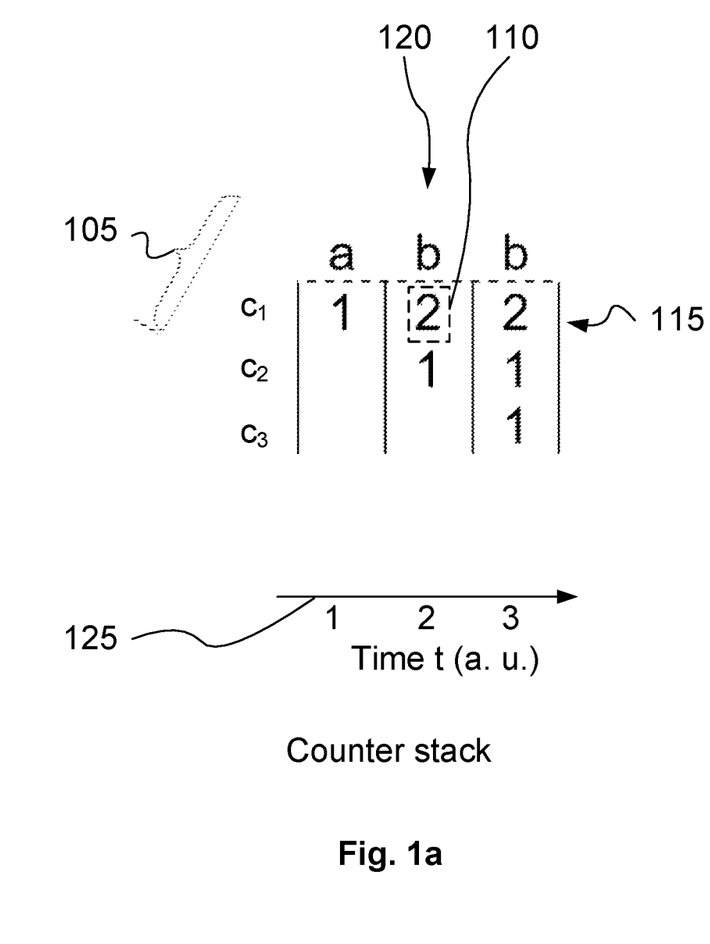
FIG. 1a illustrates a stack of counters.

FIG. 1a illustrates a stack of counters. A stack of counters is a matrix 105 having a number of elements 110 organized in rows and columns. Each row 115 corresponds to a counter and each column represents the state 120 of a stack of counters at a certain time step 125, such that each element 110 represents the state (i.e. the count or the value) of a counter at that time step. As time increases incrementally 125, the state of a stack of counters is represented by a new column. An element 110 lies at the intersection of a row and a column. At each time increment, a new counter is added to the stack of counters. A top row above the matrix illustrates a trace of accesses to data blocks including data block a, data block b, and possibly more, by a cache client. The matrix is populated as follows. For counter $c_1$ between time step "1" and time step "3", two different elements are accessed: data block "a" and data block "b". Therefore, the value for counter $c_1$ at time step t=3 is $c_{1,3}$=2.

Figure 1B:
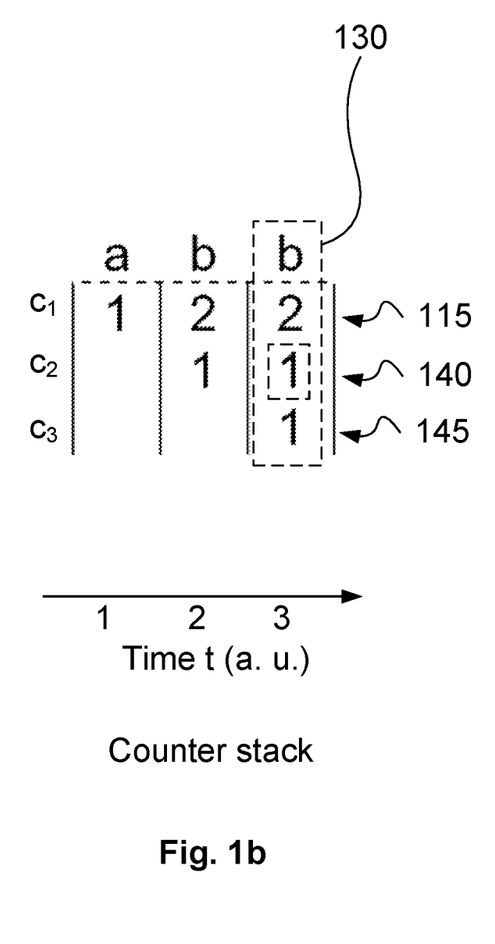
FIG. 1b illustrates the stack of counters of FIG. 1a, with emphasis on the latest state, which can be used to determine a stack distance.

FIG. 1b illustrates the stack of counters of FIG. 1a, with emphasis on the latest state, which can be used to determine a stack distance. After a matrix is populated with counter values for accesses to "a" and/or "b" as in FIG. 1a, the method of FIG. 1b involves looking at the next-to-last and last columns (columns 2 and 3, or time steps 2 and 3), the last column being the "latest state" when a stack distance is to be determined. Therefore, each time a stack is updated with a new column in FIG. 1a, a new stack distance can be determined as in FIG. 1b. Determining a stack distance with a stack of counters can involve identifying in the latest state 130 (column, or time step) a counter for which the value has not increased, for example:

From time step 2 to time step 3, the state of counter $c_1$ has not increased from value 2 to value 2, therefore counter $c_1$ is acceptable.

From time step 2 to time step 3, the state of counter $c_2$ has not increased from value 1 to value 1, therefore counter $c_2$ is acceptable.

From time step 2 to time step 3, The state of counter $c_3$ has increased from "no value" to value 1, therefore counter $c_3$ is not acceptable.

Then, from the accepted counters $c_1$ and $c_2$, the method involves selecting the counter, of $c_1$ and $c_2$, for which the next counter, $c_2$ and $c_3$ respectively, increases in value from time step 2 to time step 3. For example:

For counter $c_1$, the next counter $c_2$ does not increase in value from 1 to 1, and therefore counter $c_1$ is not acceptable.

For counter $c_2$, the next counter $c_3$ does increase from "no value" to 1, therefore counter $c_2$ is selected.

Identifying for the selected counter $c_2$ its row number, which is 2, and its column number, which is 3.

By selecting counter $c_2$, the above method has identified when the data block accessed at time step 3, i.e. data block "b", was last accessed, and the answer is time step 2, because counter $c_2$ does not increase in value from 1 to 1. The stack distance for access to data block b at time t=3, is the value in counter $c_2$, at time step 3, which is 1.

A definition of the value in each counter, where the counter has a row number y and a column number t, can be the number of unique accesses between two time steps. For example, a counter $c_2$ can be further indexed as $c_{2,3}$ indicating that its value is the number of unique accesses, between time step 2 and time step 3.

In a data structure for a stack of counters according to embodiments, each element is a HyperLogLog (HLL) counter having a data structure (HLL data structure) with which an HLL method can approximate the number of distinct elements in a data set, at each time step.

An HLL method is a probabilistic method for approximating the cardinality of a set of data, e.g. in a sequence of data block requests. It can make an estimation of the number of distinct elements in a data set, without having to store all of the elements of the data set. In embodiments, an HLL counter is used as a counter at each time step. An HLL method is based on an assumption that a hash function generates equally distributed hashed values. These hashed values can be used by an HLL method to generate parameters for approximation used in a cardinality calculation which approximates the number of distinct elements in a data set.

An HLL method maintains an array of $2^b$ buckets, where b is a precision parameter that is typically an integer between 4 and 16, for example. An HLL method has two primary operations: insert, and query. The insert operation adds an item to a bucket of an HLL data structure, and the query operation returns the estimated cardinality of the inserted items.

Figure 2A:
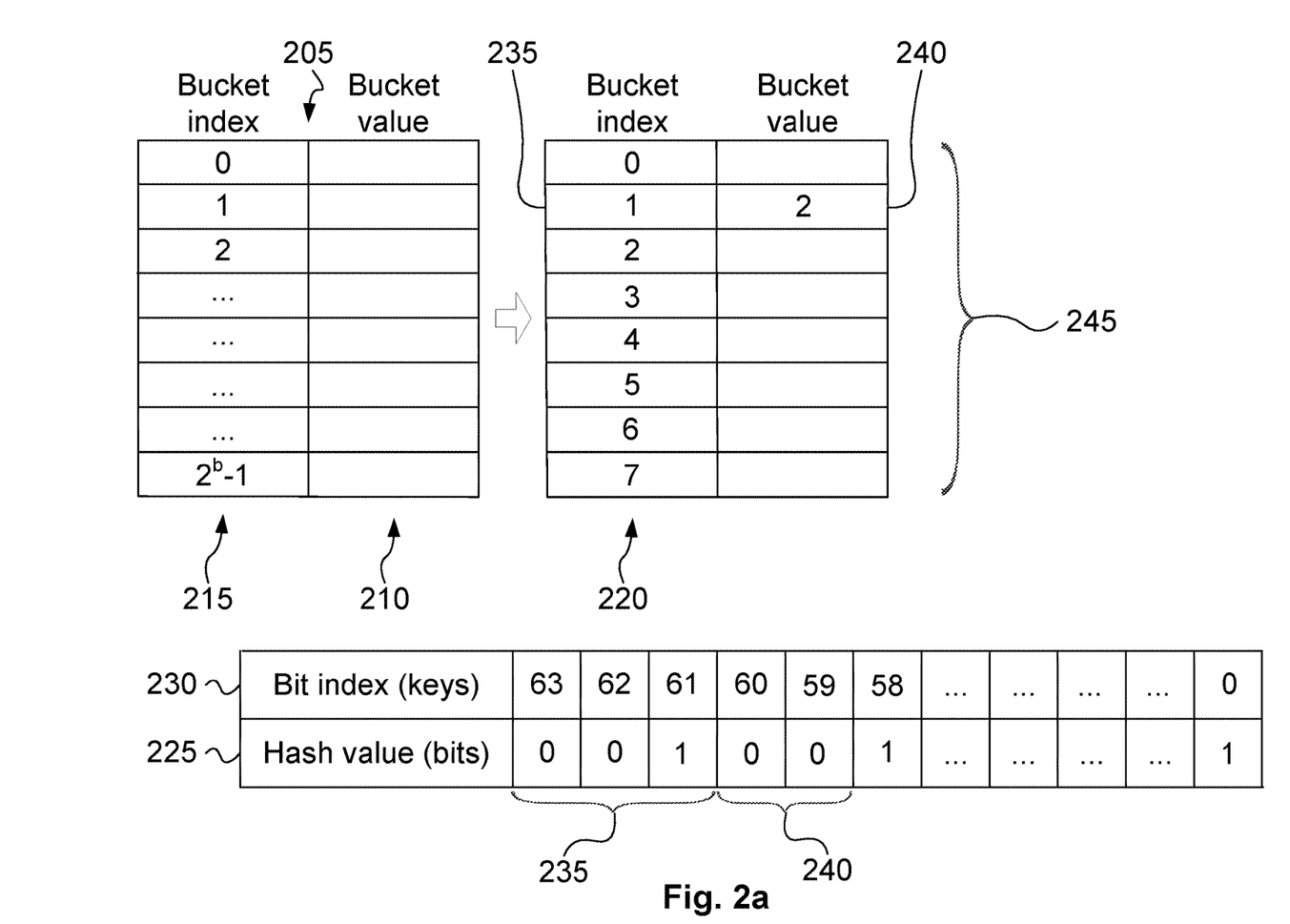
FIG. 2a illustrates a 1-dimensional (1D) hyperloglog (HLL) data structure, that can be used to calculate a cardinality of a data set, according to prior art.

FIG. 2a illustrates a 1-dimensional (1D) HLL data structure, that can be used to calculate a cardinality of a data set, according to prior art. An HLL data structure 205 can include a number $2^b$ of buckets 210, each bucket indexed 215 from 0 to $2^b-1$. If b=3 for example, the number of buckets in the HLL data structure 210 is $2^3$=8, and the buckets can be indexed 220 from 0 to 7.

To estimate the cardinality of a data set, a hash function can initially be used to generate a 64 bit hash value 225 from an address key of a cached data block, each bit indexed 230 from 0 to 63. The leading b=3 bits 235, which are "001", can be selected as the binary form of a decimal index for a bucket 235, which for "001" corresponds to decimal index "1". The value in bucket "1" can be updated to be the number of leading zeroes (NLZ), following the first 3 bits. In this case, the NLZ 240 is "2" and therefore the bucket value for bucket index "1" 235 is "2" 240.

As other examples with b=3: for hash value "11101110", then NLZ=1, and for hash value "10000001", then NLZ=4. The set 245 of bucket values in the HLL data structure can be used to determine a parameter for approximation, as used in a cardinality calculation of a data set, according to an HLL method of the prior art.

The above method can be used for cached data without a TTL, but it cannot be used for a cached data set that includes data with TTL.

Figure 2B:
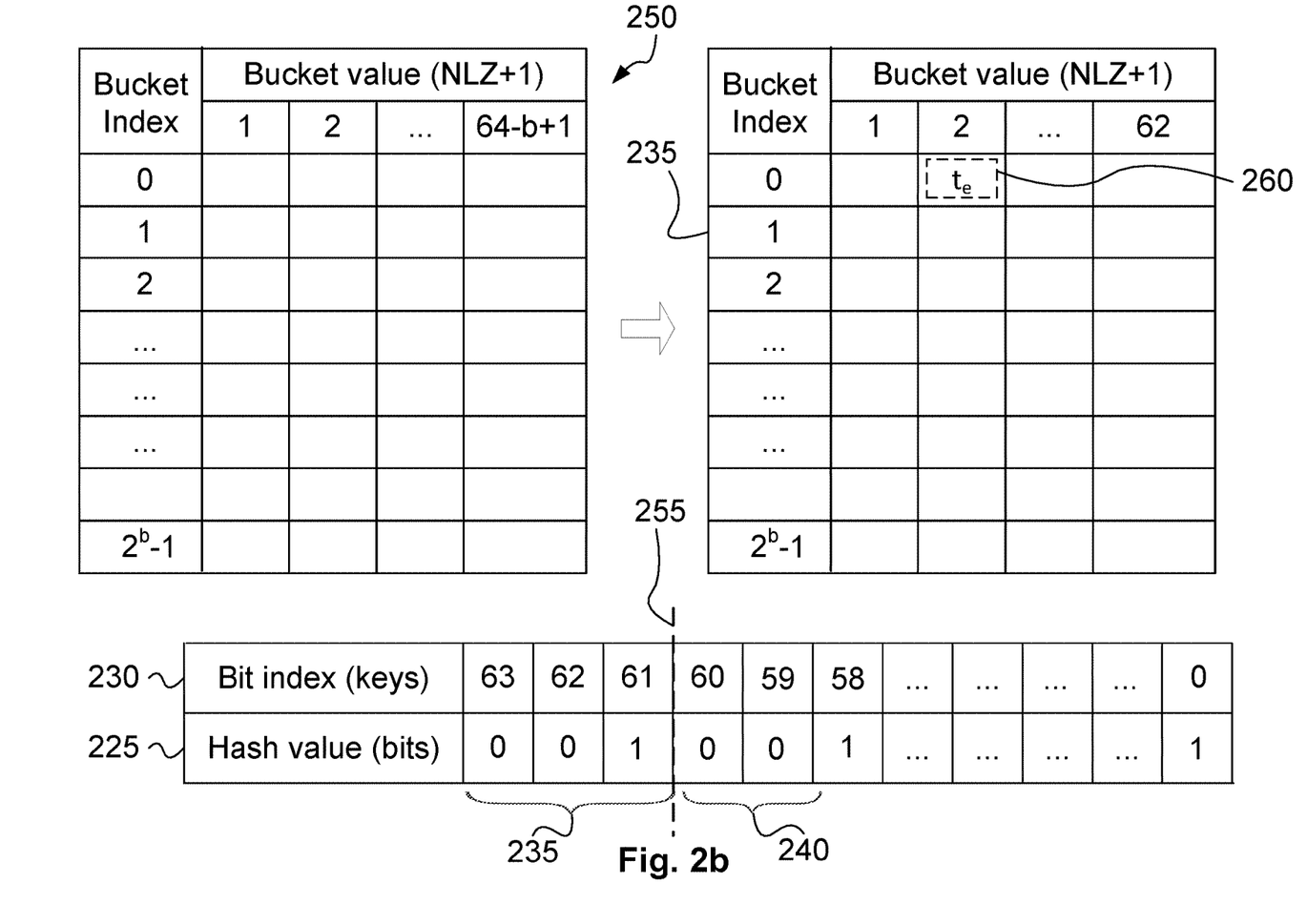
FIG. 2b illustrates a 2-dimensional (2D) hyperloglog (HLL) data structure, according to an embodiment.

While an HLL data structure 205 according to prior art is a 1D array of buckets, an HLL data structure according to embodiments is a 2-dimensional (2D) array of buckets, in which TTL information can be stored. For example, a data can be the string of characters such as "test", and it can have a TTL of 10 seconds. The value "10", or an expiry time $t_e = t_s + TTL$, can be stored in a bucket of the 2D array of an HLL data structure according to embodiments, where $t_s$ is the moment in time when the data is stored. An expiry time can also be referred to as an eviction time.

In an embodiment, each data block has an address and each request (in a batch of requests), accesses a data block using its address. A hashed value of a request for cached data block can be viewed as a hashed value of the data block's cache address. Given a key-value pair in a cache: Key1 and Value1, when a request is for accessing Value1, it provides the key (address) to the cache system. In this case, the key is Key1. Key1 can be hashed and the value Value1 can be stored in a data block.

In an embodiment, a data that is added to a cache, such as the string "test", can initially have its cache address key hashed into value of 8 bits for example. The 8 bit sequence generally includes a number of leading zeroes (NLZ) after a $b^{th}$ bit (or a conceptual partition after the $b^{th}$ bit of the sequence), with b<8 being an integer. By selecting a hashed value of 8 bits, a 2D array of buckets, having a limited size can be defined, in which the number of rows is 8 (i.e. from row 0 to row 7), and the number of columns is equal to the NLZ, after the $b^{th}$ hashed character. For example, by selecting b=3, a 2D array has 8 rows, and a number of columns equal to 8−3=5, resulting in a total of 8×5=40 buckets. The NLZ, which varies from 1 to 5, can therefore identify one of the 5 columns, while the bucket at the intersection of the row and column, is free to store an expiry time of data "test", instead of the NLZ. An expiry time is a storage time of a data block plus the TTL indicator of a request for that data block, i.e. $t_e=t_s+TTL$, where $t_s$ is the time when the data is first stored in the cache, and the TTL is for example "10 seconds". If a bucket is occupied, the greater value of the two is kept.

Parameter b can be referred to as a precision parameter which can be used for determining a number of rows and a number of columns for a 2D HLL counter.

Allocating a cache size according to embodiments of a method involves receiving a plurality of requests, each request for accessing a data block of a cache, and having a TTL indicator; generating a stack of 2D hyperloglog (HLL) counters; determining a stack distance for each request with a 2D HLL counter, each position in the 2D HLL counter identifying an expiry time based on the TTL indicator; generating a miss ratio curve, using a frequency distribution of the stack distances; determining the cache size according to the miss ratio curve; and allocating a cache of the determined cache size to satisfy a given performance requirement.

FIG. 2b illustrates a 2D HLL data structure, according to an embodiment. A 2D HLL data structure is a 2D HLL counter for counting unique accesses to data blocks between two time steps. In this case, an HLL data structure 250 can include a number $2^b$ of rows, indexed from 0 to $2^b-1$. A hash function can be used to hash, from a cached data block's address key, a 64-digit hashed value 225 including a plurality of equally distributed hashed bits. The first 3 bits of the hashed value can be used to determine the index of a row in the HLL data structure. For example, by setting b=3, the HLL data structure 250 can be set to includes 2 b=2 3=8 rows, labelled from 0 to 7. The first 3 bits 235 of the hashed value, which for example can be "001", can be selected as the binary form of a row index 235, which for "001" corresponds to the row with decimal index "1". To determine the column, the number of leading zeroes (NLZ) in the string of digits following the first 3 bits 235 of the hashed value, is used. In this case, that string is "001 . . . ", and therefore the NLZ is "2". An expiry time $t_e=t_s+TTL$ is then stored 245 in the bucket identified by row "1", column "2".

More generally, each position in the 2D HLL counter identifies an expiry time and can be determined by: hashing a string of bits with a hashing method, the length of which string is determined by the hashing method; determining a number of leading bits in the string of bits according to the precision parameter b, which leading bits when converted to a decimal number determine a row of the 2D HLL counter; and determining a number of leading zeroes (NLZ), after the leading bits, which NLZ determines a column of the 2D HLL counter.

The HLL data structure 250 can include a number of columns equal to 64−b+1=62, and then b=3 can also determine a position 255 from where to count a number of leading zeroes (NLZ) 240. The NLZ 240 can be used to identify a column of the HLL data structure. For example, if a hashed value is 00100101, then b=3 determines that a count of leading zeroes starts after the first 3 digits "001", that is at the 4$^{th}$ digit. In the remainder "00101", the NLZ 240 is seen to be "2". This leads to column "2" of the HLL data structure. Given row number "1" and column number "2", bucket (1,2) 260 is updated to contain the greatest of an expiry time $t_e$ it already contains, and a new expiry time $t_e$. related to the cached data block from which the address key was hashed.

In an HLL data structure according to an embodiment, instead of using the NLZ following the first b bits (e.g. b=3) as a bucket value, the NLZ is used as a column index.

Each bucket of an HLL data structure according to embodiments can therefore store an expiry time based on a TTL. When a data block is accessed, an expiry time in the access is compared with an expiry time in a bucket identified with a hash value. If the expiry time from the access is greater than the expiry time in the bucket, then the expiry time in the bucket identified with the hash value may be updated.

Then, in an HLL data structure according to embodiments, estimating the cardinality of a data set is performed using as parameters the index of each row, and for each row, the index of the first column (left-most column from left to right) for which the bucket records an expiry time that is not expired and not 0.

To estimate the cardinality of a data set at a certain time t, each expiry time $t_e$ in a bucket, that is less than or equal to t ($t_e \leq t$) is reset to a value of $t_e=0$. Then, the 2D array 250 is reduced to a 1D array 205, by storing the column indices selected above into buckets of a corresponding row of a 1D array 205. In other words, a 2D HLL counter can be converted into a 1D array, based on the expiry times.

In other words, converting the 2D HLL counter into a 1D array, based on expiry times, comprises scanning each row of the 2D HLL counter from the lowest indexed column to the highest indexed column; selecting for each row the index of the lowest indexed column; storing an expiry time that is non-expired and greater than 0; and storing in a 1D array each index of a lowest indexed column.

Yet in other words, to reduce a 2D HLL counter 250 to a 1D array 205, a process can be as follows: for each row of the 2D array, a scan is performed from left to right, the left-most bucket of the row, storing an expiry time $t_e$ that is non-expired time and that is greater than 0 ($t_e>0$) is selected, and the column index of that bucket becomes bucket value of a corresponding row of a 1D array. The resulting 1D array can be used to determine a plurality of parameters for an approximation of a cardinality calculation from the 1D HLL counter.

Figure 3:
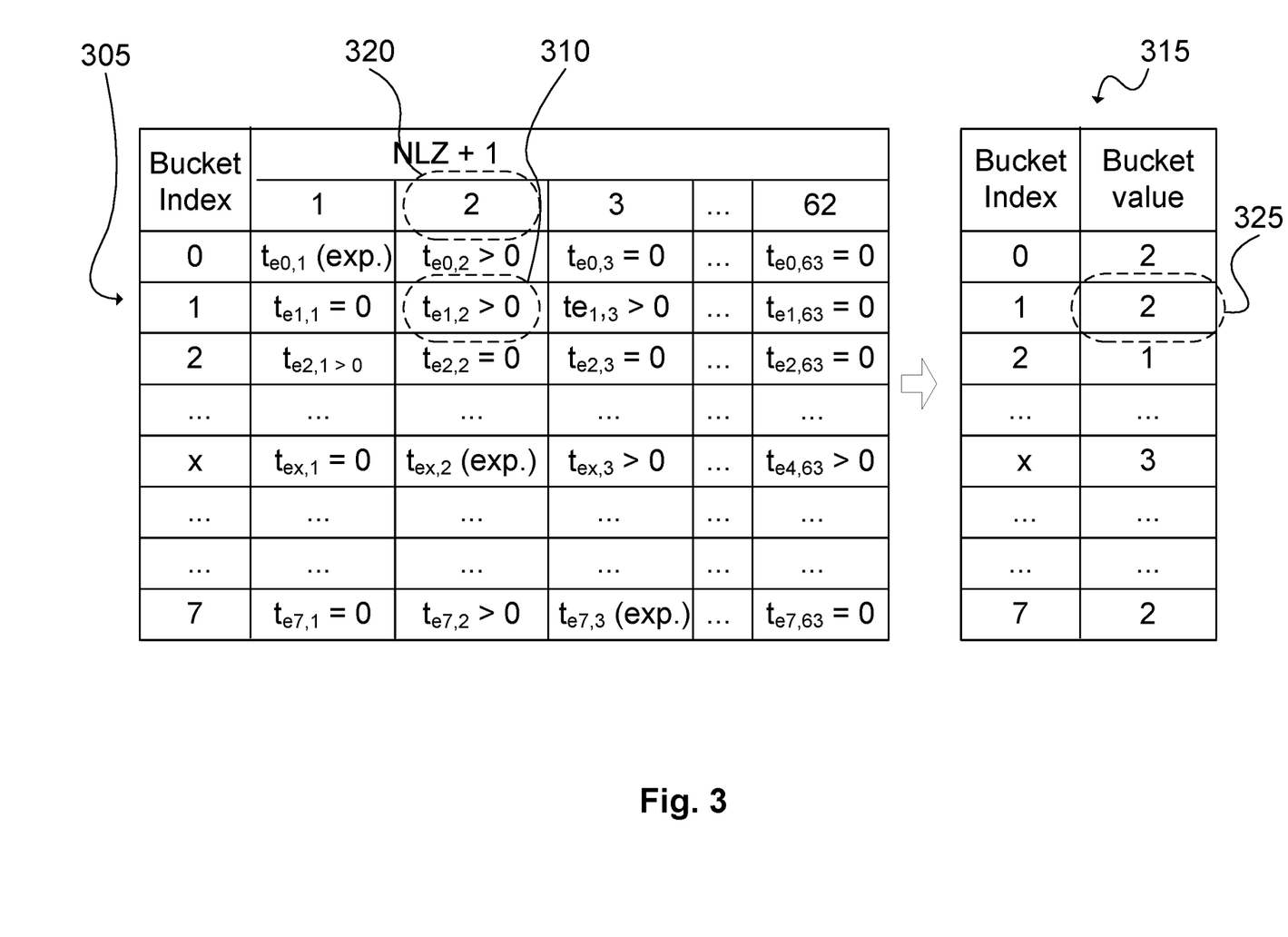
FIG. 3 illustrates a conversion from a 2D HLL with time-to-live (HLL-TLL) data structure to a 1D HLL-TTL data structure, according to an embodiment

FIG. 3 illustrates a conversion from a 2D HLL-TTL data structure to a 1D HLL-TTL data structure, according to an embodiment. Each bucket contains an expiry time that is either expired (exp.), that is 0 ($t_e=0$), or that is greater than 0 ($t_e>0$). For each row of the 2D array, a scan from left to right identifies the buckets storing an expiry time $t_e$ that is non-expired time and that is greater than 0 ($t_e>0$). The left-most bucket of each row respecting these conditions is selected, and its column index becomes the bucket value in a corresponding row of a 1D array.

In other words, a method to generate an MRC according to embodiments, makes use of a 2D HLL data structure including TTL (HLL-TTL), according to embodiments. In a count operation according to a HLL method, a 2D HLL data structure including expiry times is scanned for expiry times that are equal or greater than a current time. For each row of the 2D HLL data structure, a scan is performed from left to right, and the first (left-most) bucket storing an expiry time $t_e$ that is non-expired time and that is greater than 0 ($t_e>0$) is selected. The column number of the selected bucket is the smallest in the row, for which the bucket is storing an expiry time $t_e$ that is non-expired time and greater than 0. The column number of the selected bucket becomes the bucket value in a corresponding row of a 1D array.

Then, the 2D HLL is reduced to a 1D HLL. The column indices of the selected buckets are selected as the bucket value of a corresponding row of a 1D array.

As an example, for row number 1 ("bucket index 1") 305, a scan from left to right shows that the first (left-most) bucket having a non-expired time larger than 0 is the bucket 310 at column 2 (320). In a 1D array 315, the bucket value 325 for the bucket of the corresponding row 1 is therefore chosen as "2".

Figure 4:
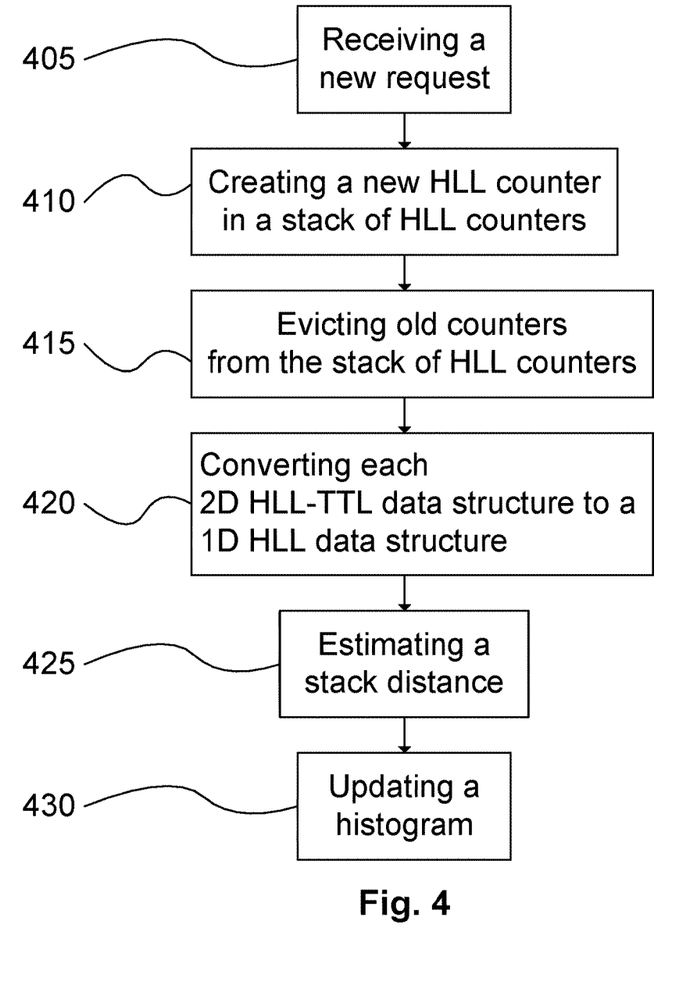
FIG. 4 illustrates a process to update a stack distance histogram, according to an embodiment.

After conversion from a 2D HLL counter to a 1D array, an estimated cardinality can be computed according to an HLL method, and a frequency distribution of stack distances (histogram) can be updated according to the process in FIG. 4.

FIG. 4 illustrates a process to update a frequency distribution of stack distances (histogram), according to an embodiment. Initially, a processor managing a cache receives 405 a new request for a data block in the cache. If certain conditions are met, it can then create 410 a new HLL counter in a counter stack of HLL counters, and evicts 415 old HLL counters. Then, it converts 420 the data structure of each HLL counter from a 2D array to a 1D array, based on the expiry times to stored in buckets of each HLL counter, as in FIG. 3. Then, the processor estimates 425 a stack distance for the stack of HLL counters, and updates 430 the frequency distribution of stack distances (histogram) to create an MRC.

The number of distinct elements in a stack of HLL counters can be used for calculating a plurality of stack distances. After many stack distances are obtained, they can be arranged as a frequency distribution of stack distances, which can be converted into a miss ratio curve on a scatter plot.

A method to obtain an MRC according to embodiments therefore makes use of TTLs to adjust parameters for approximation of cardinality in an estimation of cardinality. This is then used to calculate stack distances, which can be used to update a histogram and obtain an MRC.

Because an HLL data structure according to embodiments involves a 2D array that includes TTL information, the memory space (memoryspace$_{newHLL}$) it requires is greater than the memory space (memoryspace$_{oldHLL}$) required for an HLL data structure of the prior art, and it is greater by a linear scaling factor. In a case where each TTL can be represented by 4 bytes, then the memory space required for an HLL data structure according to embodiments would be:

$$\text{memoryspace}_{newHLL} = 4(64-b)\text{memoryspace}_{oldHLL}$$

For practical considerations, the amount of memory required can be reduced by using, instead of 2D array, a linked list. With a linked list, memory allocations occur when needed, which can significantly reduce the factor of (64-b). With this approach, a faster computation can be achieved.

To process a stack of counters in accordance with an embodiment, the following steps can be performed.

Figure 5:
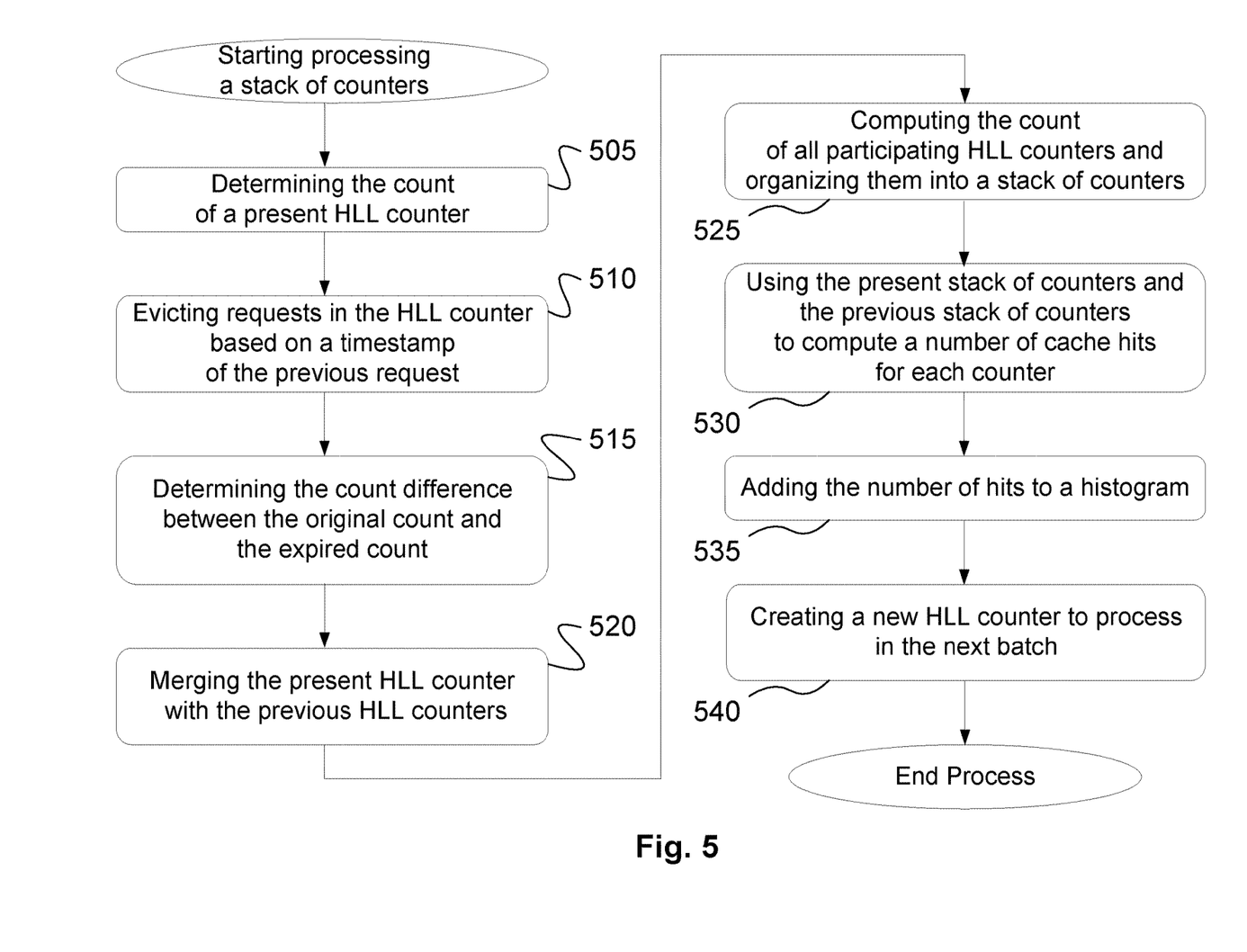
FIG. 5 is a flowchart illustrating steps to process an HLL counter with a stack of HLL counters, according to an embodiment.

FIG. 5 is a flowchart illustrating steps to process a stack of HLL counters, according to an embodiment. Initially, this method involves determining 505 the count of requests for cache data, from a present HLL counter. Then, the processor evicts 510 requests in the present HLL counter, based on a timestamp of a previous counter.

Then, it determines 515 a count difference between the original count of requests, and the count of requests after expired requests have been evicted.

Then, it merges 520 the present HLL counter with the previous HLL counters.

Then, it computes 525 the count of all participating HLL counters, and organizes them into a stack of HLL counters.

Then, it uses the present stack of HLL counters and the previous stack of HLL counters to compute 530 a number of cache hits for each counter, each counter corresponding to a unique access to data blocks between two time steps. By comparing each counter in the current stack with the previous stack, a number of cache hits can be determined.

Then, it adds 535 the number of cache hits to a histogram.

Then, it creates 540 a new HLL counter to process a next batch of requests.

In an embodiment, a plurality of requests can be processed as a batch of requests. This involves maintaining an ordered list of expiry times. The memory space for this list of expiry times can be limited to correspond with a number of most recent requests.

Figure 6:
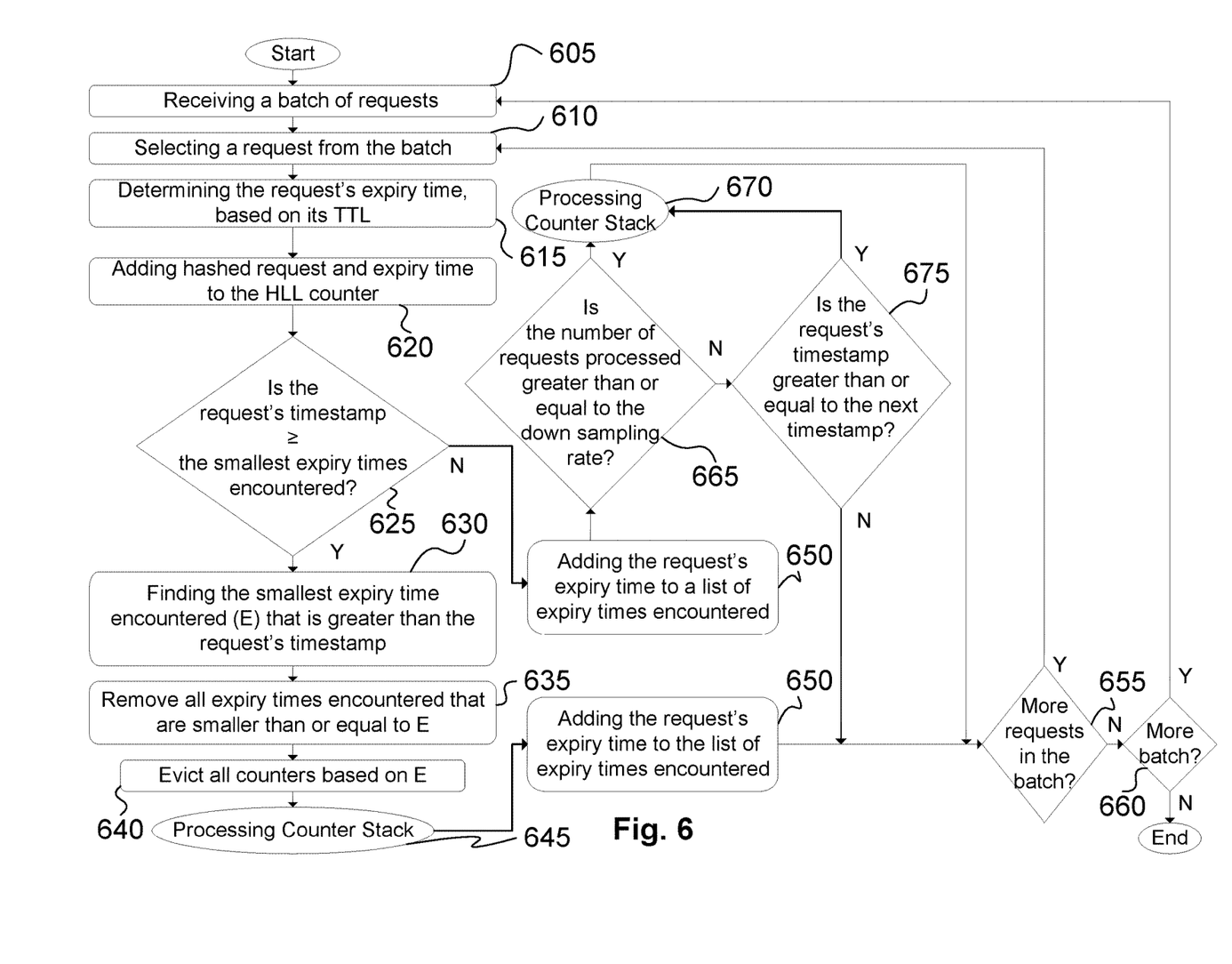
FIG. 6 is a flowchart illustrating a process for processing a batch of request for cached memory blocks, according to an embodiment.

FIG. 6 is a flowchart illustrating a process for processing a batch of requests for cached data blocks, according to an embodiment. After receiving 605 a batch of requests, and selecting 610 a request from the batch, a processor can determine 615 the request's expiry time $t_e$, based on a TTL of the request. A hashed version of the request, and the request's expiry time can be added 620 to an HLL counter.

If 625 the request's timestamp is greater than or equal to the smallest expiry time encountered, the processor can find 630 the smallest expiry time (E) encountered, that is greater than the request's timestamp, and remove 635 those expiry times encountered that are smaller than or equal to E. Counters based on E can then be evicted 640.

The stack of counters can then be processed 645, and the processor can add 650 the request's expiry time to the list of expiry times encountered.

If 655 there aren't any more requests in the batch and if 660 there aren't any more batches, the process can end.

If 625 the request's timestamp is less than the smallest expiry time encountered, the processor can add 650 the request's expiry time to the list of expiry times encountered and determine if 665 the number of requests processed is greater than or equal to the down sampling rate. If so, then the stack of counters can then be processed 670. And if 655 there aren't any more requests in the batch, and if 660 there aren't any more batches, the process can end.

If the number of requests processed is not greater than or equal to the down sampling rate, then the processor can determine if 675 the request's timestamp is greater than or equal to the next timestamp. If so, then the stack of counters can then be processed 670, before it is determined whether there are any more requests 655 in the batch, any more batches 660 before the process can end.

In any case, if there are more requests 655 in the batch, or more batches 660, the process can start over by receiving 605 a batch of requests or selecting 610 a request from a batch, respectively.

While processing each request in a batch, a timestamp for the request being processed is compared with the smallest expiry time from the list of expiry times. If the timestamp is greater than the smallest expiry time, then the batch processing is terminated prematurely. This effectively results in processing a smaller batch. A precision parameter can be used to control the grouping of expiry times, by rounding each expiry time in the list of expiry times to the nearest time unit (e.g. second).

In a counter stack method of the prior art, the space complexity of a counter stack is on the order of O(log M/p), where the number M is the number of distinct accesses in data set, and p is a number indicating the difference between two counters, as defined by a user, below which a method considers them to be the same counter, and prunes one of them. In an embodiment however, the space complexity can be reduced to have a fixed or linear memory space overhead, i.e. on the order of O(1). In an embodiment, whenever a fixed size is about to be exceeded, a dynamic pruning method can guarantee the removal of at least one counter.

When a new request for a data block is being processed, if an address key for the requested data block does not exist in the stack, then this is a cache miss, and new objects will be added to the top of the stack. If the address key exists in the stack, then the position of that address key in the stack corresponds to the minimum cache size required to cache that object. This is called the stack distance (also known as reuse distance). A frequency distribution (histogram) of stack distances can be maintained, and an MRC can be generated as an inverse cumulative distribution function (CDF) of the stack distance histogram.

A method according to embodiments can support counter pruning, counter set pruning, as well as variations. A counter can be pruned whenever its value is at least a factor of (1-δ) times the corresponding counter in the next oldest counter set, where δ is a number indicating the difference between two counters, as defined by a user, below which a method considers them to be the same counter, and prunes one of them. In an example, δ=0.01. A set of counters can be pruned (counter set pruning) when the value in each one of its counters is at least a factor of (1-δ) times the value of a corresponding counter in the next oldest set of counters.

An HLL counter can be replaced with a pointer to the next oldest corresponding HLL counter.

Embodiments include a more practical way to predict caching usage, which can benefit many systems in terms of resource management. Because a caching pattern is a fundamental pattern in a computer system, many chips or applications using a cache can benefit from improved caching.

Figure 7:
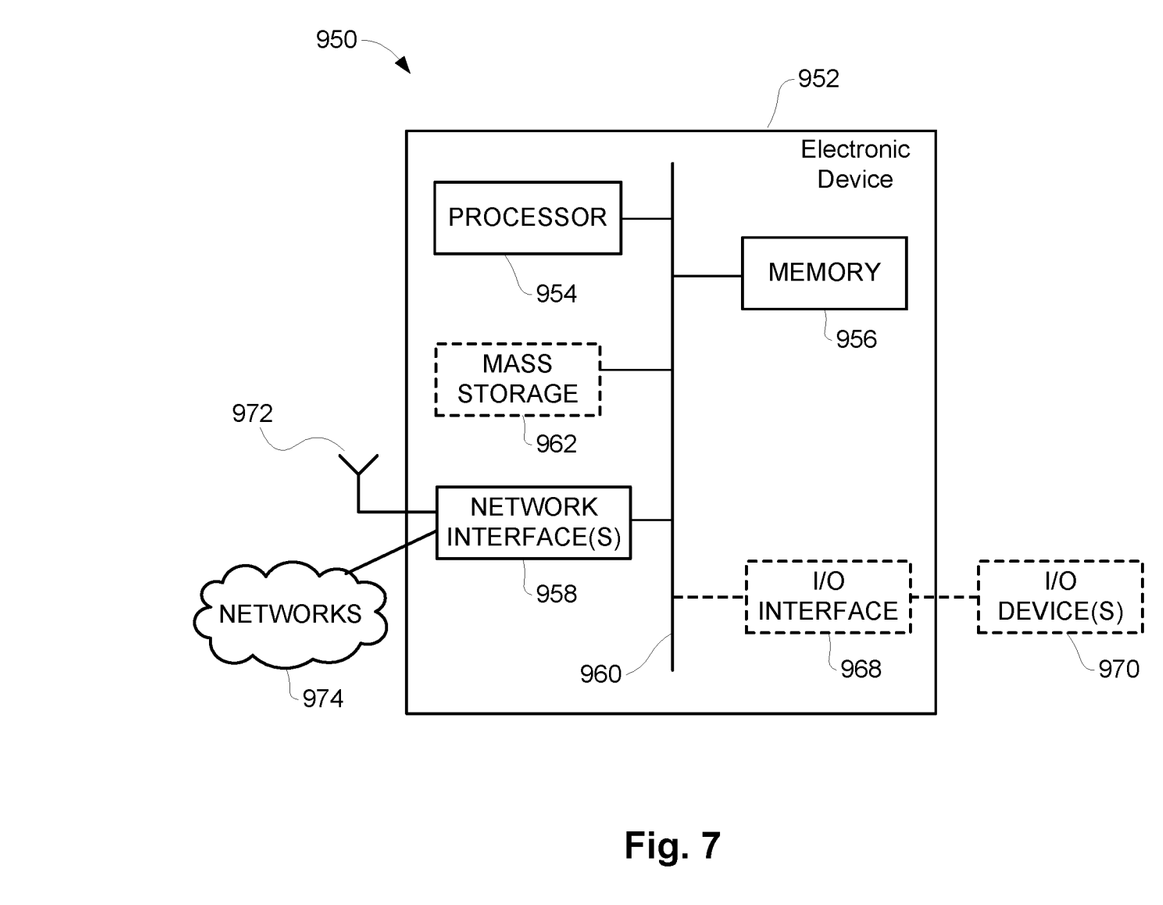
FIG. 7 is a block diagram of an electronic device illustrated within a computing and communications environment that may be used for implementing the devices and methods disclosed herein, such as determining an MRC.

FIG. 7 is a block diagram of an electronic device (ED) 952 illustrated within a computing and communications environment 950 that may be used for implementing the devices and methods disclosed herein, such as determining an MRC where data is associated with TLL. The electronic device 952 typically includes a processor 954, such as a central processing unit (CPU), and may further include specialized processors such as a field programmable gate array (FPGA) or other such processor, a memory 956, a network interface 958 and a bus 960 to connect the components of ED 952. ED 952 may optionally also include components such as a mass storage device 962, a video adapter 964, and an I/O interface 968 (shown in dashed lines).

The memory 956 may comprise any type of non-transitory system memory, readable by the processor 954, such as static random-access memory (SRAM), dynamic random-access memory (DRAM), synchronous DRAM (SDRAM), read-only memory (ROM), or a combination thereof. In an embodiment, the memory 956 may include more than one type of memory, such as ROM for use at boot-up, and DRAM for program and data storage for use while executing programs. The bus 960 may be one or more of any type of several bus architectures including a memory bus or memory controller, a peripheral bus, or a video bus.

The electronic device 952 may also include one or more network interfaces 958, which may include at least one of a wired network interface and a wireless network interface. A network interface 958 may include a wired network interface to connect to a network 974, and also may include a radio access network interface 972 for connecting to other devices over a radio link. The network interfaces 958 allow the electronic device 952 to communicate with remote entities such as those connected to network 974.

The mass storage 962 may comprise any type of non-transitory storage device configured to store data, programs, and other information and to make the data, programs, and other information accessible via the bus 960. The mass storage 962 may comprise, for example, one or more of a solid-state drive, hard disk drive, a magnetic disk drive, or an optical disk drive. In some embodiments, mass storage 962 may be remote to the electronic device 952 and accessible through use of a network interface such as interface 958. In the illustrated embodiment, mass storage 962 is distinct from memory 956 where it is included and may generally perform storage tasks compatible with higher latency but may generally provide lesser or no volatility. In some embodiments, mass storage 962 may be integrated with a heterogeneous memory 956.

In an embodiment, a system for allocating a cache size comprising at least one processor, at least one cache, and machine readable memory storing machine readable instructions which when executed by the at least one processor, configures the at least one processor to receive a plurality of requests, each request for accessing a data block of a cache, and having a TTL indicator; generate a stack of 2D hyperloglog (HLL) counters; determine a stack distance for each request with a 2D HLL counter, each position in the 2D HLL counter identifying an expiry time based on the TTL indicator; generate a miss ratio curve, using a frequency distribution of the stack distances; determine the cache size according to the miss ratio curve; and allocate a cache of the determined cache size to satisfy a given performance requirement. The network interface 974 and I/O interface 968 can also allow for storage and/or processing to occur externally.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage, and connectivity resources (along with other resources within the network) can be divided between different sub-networks, in some cases in the form of a resource slice. If the resources across a number of connected data centers or other collection of nodes are sliced, different network slices can be created.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method to allocate a cache comprising:
receiving a plurality of requests, each request for accessing a data block of the cache, and having a time-to-live (TTL) indicator;
generating a stack of two-dimensional (2D) hyperloglog (HLL) counters, each 2D HLL counter of the stack having respective rows and respective columns, each position in the 2D HLL counter having a respective row index and a respective column index;
determining a stack distance for each request with a 2D HLL counter of the stack of 2D HLL counters, each position in the 2D HLL counter identifying an expiry time based on the TTL indicator;
generating a miss ratio curve, using a frequency distribution of the stack distances;
determining a cache size according to the miss ratio curve; and
allocating the cache of the determined cache size to satisfy a given performance requirement,
wherein determining the stack distance for each request with the 2D HLL counter comprises, for each respective request:
hashing, in accordance with a hashing method, an address key of a respective data block of the cache to obtain a respective string of bits, a length of the respective string of bits being determined by the hashing method;
determining, in accordance with a precision parameter, the precision parameter being an integer number, a first number of leading bits in the respective string of bits, the first number of leading bits, when converted to a decimal number, determining, for the respective request, the row index for the respective request; and
determining a second number of leading zeroes (NLZs), after the first number of leading bits in the respective string of bits, the second NLZs determining, for each respective request, the column index for the respective request.

2. The method of claim 1, further comprising:
converting the 2D HLL counter into a one-dimensional (1D) array, based on the expiry times.

3. The method of claim 2, wherein converting the 2D HLL counter into the 1D array, based on the expiry times, comprises:
scanning each row of the 2D HLL counter from a lowest indexed column to a highest indexed column;
selecting for each row the index of the lowest indexed column;
storing the expiry time that is non-expired and greater than 0; and
storing in the 1D array each index of the lowest indexed column.

4. The method of claim 2, further comprising:
determining a plurality of parameters for an approximation of cardinality calculation from the 1D HLL array.

5. The method of claim 1, wherein each 2D HLL counter is for counting unique accesses to data blocks between two time steps.

6. The method of claim 1, wherein each expiry time is a storage time of the data block plus the TTL indicator of the request for that data block.

7. A system for allocating a cache comprising:
at least one processor,
at least one cache, and
a machine readable memory storing machine readable instructions which when executed by the at least one processor, configures the at least one processor to:
receive a plurality of requests, each request for accessing a data block of the cache, and having a time-to-live (TTL) indicator;
generate a stack of two-dimensional (2D) hyperloglog (HLL) counters, each 2D HLL counter of the stack having respective rows and respective columns, each position in the 2D HLL counter having a respective row index and a respective column index;
determine a stack distance for each request with a 2D HLL counter of the stack of 2D HLL counters, each position in the 2D HLL counter identifying an expiry time based on the TTL indicator, the stack distance for each respective request being determined by at least:
hashing, in accordance with a hashing method, an address key of a respective data block of the cache to obtain a respective string of bits, a length of the respective string of bits being determined by the hashing method;
determining, in accordance with a precision parameter, the precision parameter being an integer number, a first number of leading bits in the respective string of bits according to the precision parameter, the first number of leading bits, when converted to a decimal number, determining the row index of the respective request; and
determining a second number of leading zeroes (NLZs) after the first number of leading bits in the respective string of bits, the second NLZs determining, for the respective request, the column index of the respective request;
generate a miss ratio curve, using a frequency distribution of the stack distances;
determine a cache size according to the miss ratio curve; and
allocate the cache of the determined cache size to satisfy a given performance requirement.

8. The system of claim 7, wherein the machine readable memory storing the machine readable instructions further configures the at least one processor to:
convert the 2D HLL counter into a one-dimensional (1D) array, based on the expiry times.

9. The system of claim 8, wherein the machine readable memory storing the machine readable instructions which when executed by the at least one processor configures the at least one processor to convert the 2D HLL counter into the 1D array, based on the expiry times, further configures the at least one processor to:
scan each row of the 2D HLL counter from a lowest indexed column to a highest indexed column;
select for each row the index of the lowest indexed column;
store the expiry time that is non-expired and greater than 0; and
store in the 1D array each index of the lowest indexed column.

10. The system of claim 8, wherein the machine readable memory storing the machine readable instructions further configures the at least one processor to:
determine a plurality of parameters for an approximation of cardinality calculation from the 1D HLL array.

11. The system of claim 7, wherein each 2D HLL counter is for counting unique accesses to data blocks between two time steps.

12. The system of claim 7, wherein each expiry time is a storage time of the data block plus the TTL indicator of the request for that data block.

\* \* \* \* \*